United States Patent [19]

Day

[11] Patent Number: 4,928,241

[45] Date of Patent: May 22, 1990

[54] AIRCRAFT PROPELLER CONTROL

[75] Inventor: Stanley G. Day, Cincinnati, Ohio

[73] Assignee: General Electric Company, Cincinnati, Ohio

[21] Appl. No.: 96,283

[22] Filed: Sep. 14, 1987

Related U.S. Application Data

[63] Continuation-in-part of Ser. No. 737,972, May 28, 1985, abandoned.

[51] Int. Cl.⁵ .............................................. B64C 11/50
[52] U.S. Cl. .............................. 364/424.01; 364/433; 416/34; 416/35
[58] Field of Search ................... 364/433, 434, 424.01; 244/69, 181; 416/33, 34, 35, 129

[56] References Cited

U.S. PATENT DOCUMENTS

| | | | |
|---|---|---|---|
| 2,699,304 | 1/1955 | Treseder et al. | 244/134 |
| 2,804,154 | 8/1957 | Treseder et al. | 416/129 |
| 3,586,262 | 6/1971 | Sherman | 416/129 |
| 3,589,832 | 6/1971 | Harris et al. | 416/34 |
| 3,689,175 | 9/1972 | Hartzell et al. | 416/34 |
| 4,245,955 | 1/1981 | Lambertson | 416/34 |
| 4,653,981 | 3/1987 | Harner et al. | 416/34 |
| 4,659,283 | 4/1987 | Niessen et al. | 416/34 |

FOREIGN PATENT DOCUMENTS

| | | |
|---|---|---|
| 433989 | 8/1935 | United Kingdom . |
| 591492 | 8/1947 | United Kingdom . |
| 760005 | 10/1956 | United Kingdom . |
| 872687 | 7/1961 | United Kingdom . |

Primary Examiner—Gary Chin
Attorney, Agent, or Firm—Jerome C. Squillaro; Nathan D. Herkamp

[57] ABSTRACT

In the invention, the speeds of both propellers in a counterrotating aircraft propeller pair are measured. Each speed is compared, using a feedback loop, with a demanded speed and, if actual speed does not equal demanded speed for either propeller, pitch of the proper propeller is changed in order to attain the demanded speed. A proportional/integral controller is used in the feedback loop. Further, phase of the propellers is measured and, if the phase does not equal a demanded phase, the speed of one propeller is changed, by changing pitch, until the proper phase is attained.

6 Claims, 4 Drawing Sheets

AIRCRAFT PROPELLER CONTROL

The invention herein described was made in the performance of work under a NASA contract and is subject to the provisions of Section 305 of the National Aeronautics and Space Act of 1958, Public law 85-568 (72 Stat. 435; 42 USC 2457).

This application is a continuation-in-part of application S/N 737,972, filed May 28, 1985 now abandoned.

The present invention relates to the control of counterrotating propellers in aircraft.

BACKGROUND OF THE INVENTION

FIG. 1 illustrates an aircraft 3 having tail-mounted gas turbine engines 6. The engines 6 each drive a fore propeller 9F and an aft propeller 9A which rotate in opposite directions about an axis.

FIG. 2 illustrates in greater detail the engine-propeller system of FIG. 1. To the left is a gas turbine engine 15 such as the F404 type manufactured by the assignee of the present application. For purposes of the present invention, the gas turbine engine 15 can be considered as a gas generator which generates a high energy gas stream 33 and supplies the gas stream 33 to a propeller stage 36.

The propeller stage 36 extracts energy from the gas stream 33 directly, by means of low-speed counterrotating turbine blade sets. (This is in distinction to the common approach of using a high-speed turbine whose speed is reduced en route to a propeller by a reduction gearbox.) A first set of blades 39 extracts energy from the gas stream 33 and spins fore propeller 9F. A second set of blades 42 spins the aft propeller 9A, but opposite in direction to fore propeller 9F. Bearings 47 support the blade sets and propellers and allow this counterrotation.

A pitch-change mechanism 52 for changing the pitch of the propellers 9A and 9F is shown schematically. It is desirable to control the pitch-change mechanism 52 so that the propeller pitch is proper under the prevailing operating conditions of the aircraft.

OBJECTS OF THE INVENTION

It is an object of the present invention to provide a control for the pitch-changing mechanism of counterrotating propellers.

It is a further object of the present invention to provide a control for both synchronizing and synchrophasing the propellers in a counterrotating propeller system.

SUMMARY OF THE INVENTION

In one form of the present invention, the pitches, speeds, and phase angle of counterrotating aircraft propellers are controlled.

DESCRIPTION OF THE DRAWING

FIGS. 6A-D illustrate a sequence of steps in block diagram algebra which explain a simplification of FIG. 4 which results in FIG. 5.

DETAILED DESCRIPTION OF THE INVENTION

Figure 2:
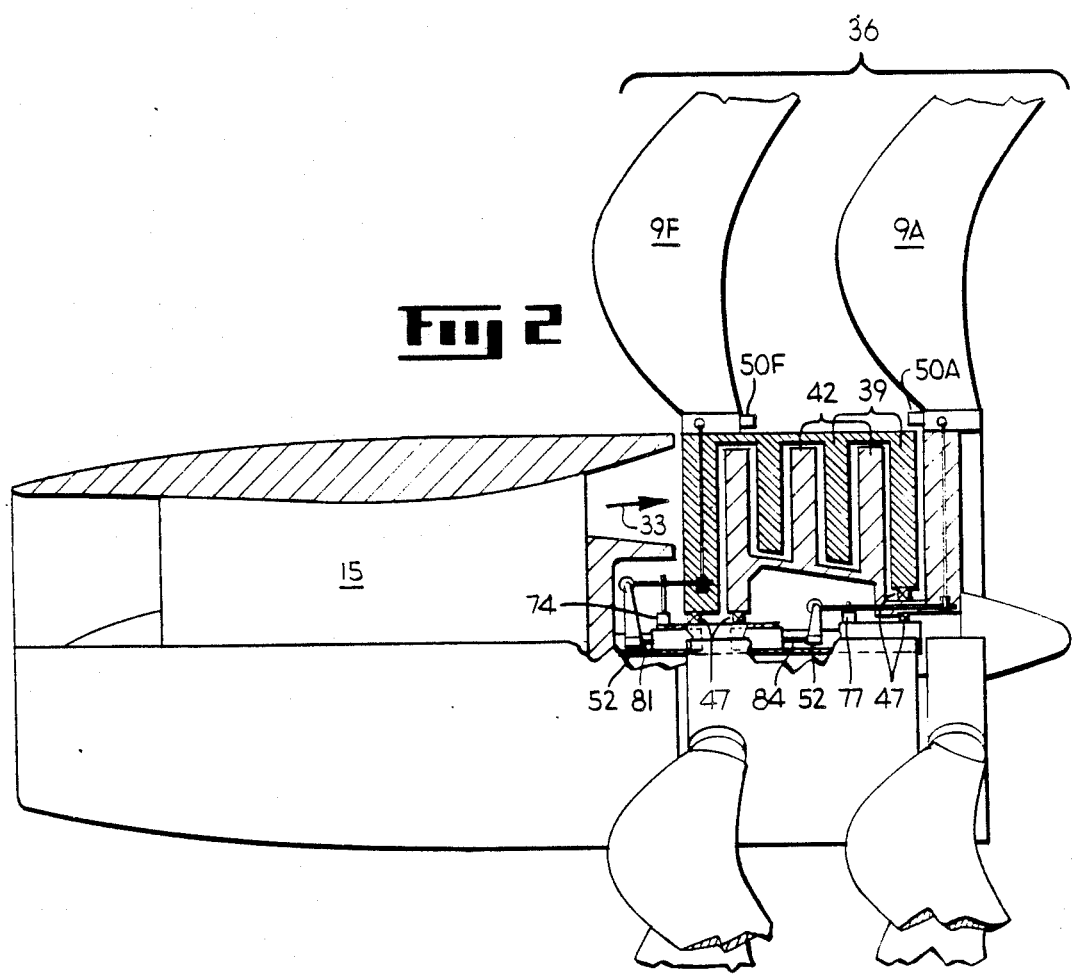
FIG. 2 illustrates in greater detail the counterrotating propellers of FIG. 1.
Figure 3:
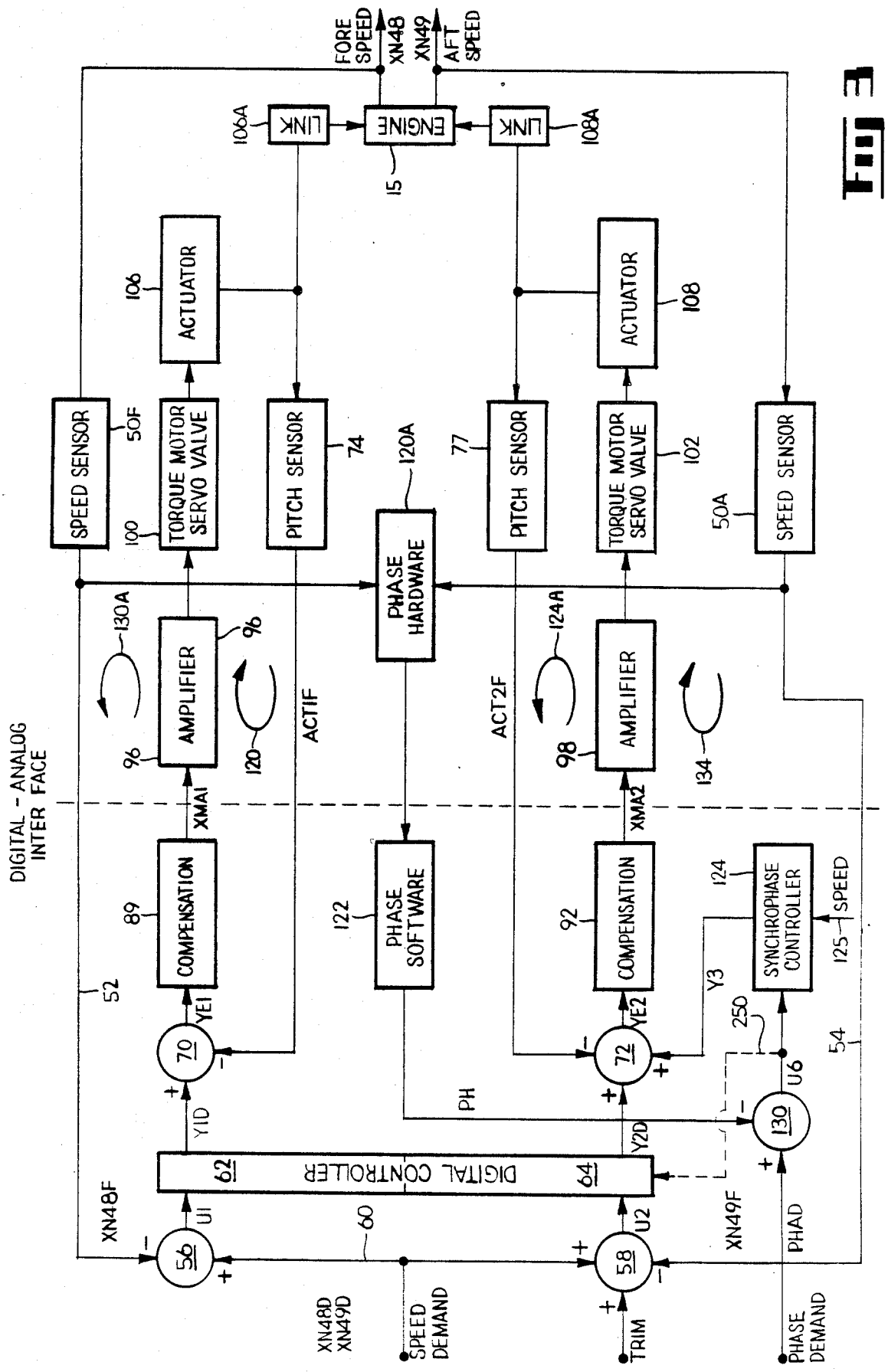
FIG. 3 illustrates one form of the present invention.

FIG. 3 illustrates one form of the present invention. Speed sensors 50F and 50A (also shown in FIG. 2) measure the respective speeds of the fore and aft propellers 9F and 9A. These speed sensors provide digital signals on lines 52 and 54 which are subtracted in summers 56 and 58. Such speed measurement is known in the gas turbine engine art.

A common speed demand signal for the propellers 9A and 9F is present on line 60 and is indicated as XN48D and XN49D. (The symbol "XN48D" etc. is used in order to correlate with the source code of a computer program which is later discussed. "D" in the symbol refers to "demand".) The speed demand signal on line 60 results from a flight requirement of the aircraft and is generated either by the pilot of the aircraft or by an automatic control. This signal indicates the speeds at which the propellers 9A and 9F are intended to rotate. In the case of signal generation by automatic control, the speed demand signal is scheduled as a function of pressures P2 (engine inlet total pressure) and P46 (intermediate pressure turbine exit pressure) of the gas turbine engine 15 in FIG. 2. The intermediate pressure turbine is not shown but is immediately upstream of arrow 33. Such scheduling is known in the art.

The speed demand signal on line 60 is added in summers 56 and 58. As a result, these summers produce speed error signals, U1 and U2, as their outputs. A speed error signal indicates the difference between the demanded speed (e.g., XN48D) and the measured speed (e.g., XN48F) of a propeller (e.g., 9F). The speed error signals U1 and U2 are fed to respective digital controllers 62 and 64.

The digital controllers 62 and 64 function as proportional/integral controllers and process the respective speed error signals U1 and U2 to thereby provide processed demand signals Y1D and Y2D. The digital controllers 62 and 64 are shown as separate blocks for ease of explanation. However, in one embodiment, they are implemented as a single digital computer program which processes speed error signals U1 and U2. The controllers 62 and 64 can be used to reduce the interactions between the two fan control loops 130 and 134 (disclosed later). The source code for one such program is given at the end of this specification.

Y1D and Y2D are presented as position demands to summers 70 and 72, wherein digital signals ACT1F and ACT2F are subtracted. ACT1F and ACT2F are position signals indicative of the actual, measured positions of linear hydraulic pistons 81 and 84 in FIG. 2, and are produced by sensors 74 and 77. Since the geometry of the linkages between the pistons and the propeller blades is known in advance, the propeller pitch can be inferred from ACT1F and ACT2F. Thus, ACT1F and ACT2F are directly indicative of piston position (pistons 81 and 84) and are indirectly indicative of propeller pitch. ACT1F and ACT2F are directly measured position signals and indirectly measured pitch signals.

One apparatus for changing the pitch of the propellers 9A and F in FIG. 2 is described in Patent Application Ser. No. 647,283, now U.S. Pat. No. 4657484 filed on Sept. 4, 1984, in which Wakeman, et al., are the inventors and which is commonly owned by the assignee of the present invention. This application is hereby incorporated by reference.

Summers 70 and 72 produce as their outputs position (or pitch) error signals YE1 and YE2. The position error signals are fed to compensation blocks 89 and 92. Compensation blocks 89 and 92 provide analog signals XMA1 and XMA2 (as opposed to the digital signals identified as YE1 and YE2) which are fed to amplifiers 96 and 98 which drive torque motor servovalves (TMSV) 100 and 102 which in turn control the actuators 106 and 108 which, in this case, take the form of pistons 81 and 84 as shown in FIG. 2. The use of an amplifier 96 to drive a TMSV 100 and an actuator 106 in FIG. 2 to effect a change in pitch of an aircraft propeller 9F is considered within the scope of one skilled in the art of control system design.

The outputs of actuator blocks 106 and 108 represent the actual spatial positions of pistons 81 and 84 in FIG. 2, which set the pitches of the propellers as discussed above. These outputs are not signals. Blocks 74 and 77 produce the signals indicative of the positions. Block 115 labeled "engine" provides the airstream 33 in FIG. 2 in order to drive the propellers 9F and 9A. Between the actuators 106 and 108 are mechanical linkage blocks 106A and 108A. These blocks emphasize the fact that a linear motion of the piston 81 and 84 is transformed into a propeller pitch change. Thus, the engine block 15 acts upon propellers having pitches determined by actuators 106 and 108. The pitch determines propeller speed under given engine output and aircraft operating conditions.

The invention described so far can be recharacterized as follows. The demanded speed signals XN48D and XN49D on line 60, together with the measured speed signals XN48F and XN49F on lines 52 and 54, produce the speed error signals U1 and U2 which are processed by the digital controllers 62 and 64, producing Y1D and Y2D. Y1D and Y2D are then modified by pitch feedback signals ACT1F and ACT2F in order to provide pitch error (actually, position error) signals YE1 and YE2. These pitch error signals induce the actuators 106 and 108 to reduce the pitch error (i.e., reduce the difference between demanded and measured pitch) by altering the pitches of the propeller blades. This blade pitch alteration affects the loading of the turbine blade sets 39 and 42 in FIG. 2, thereby changing the speed of the altered propeller, since the energy in the airstream 33 will, in the general case, remain constant.

The invention as thus far described includes a two-loop control system for each propeller, both being closed loops. One is a pitch feedback loop indicated by arrows 120 and 124A and the second is a speed feedback loop indicated by arrows 130 and 134. These loops function to maintain the propeller speeds at the single speed demanded on line 60. That is, they synchronize the propellers.

The present invention seeks not only to synchronize the propellers 9A and 9F, but also to synchrophase them in order to control noise and vibration. Synchrophasing is defined with reference to FIG. 1. Phase angle is the angle PH between blade number 1F of fore propeller 9F and blade number 1A of aft propeller 9A, but measured at a predetermined time, such as when blade 1F is in the twelve o'clock position. (It is, of course, necessary to define phase angle PH at a predetermined time, or with respect to some other reference, because the angle PH is constantly changing because of counter-rotation.) Synchrophasing is the process of adjusting the phase angle PH. The present invention controls phase angle PH as follows.

Figure 1:
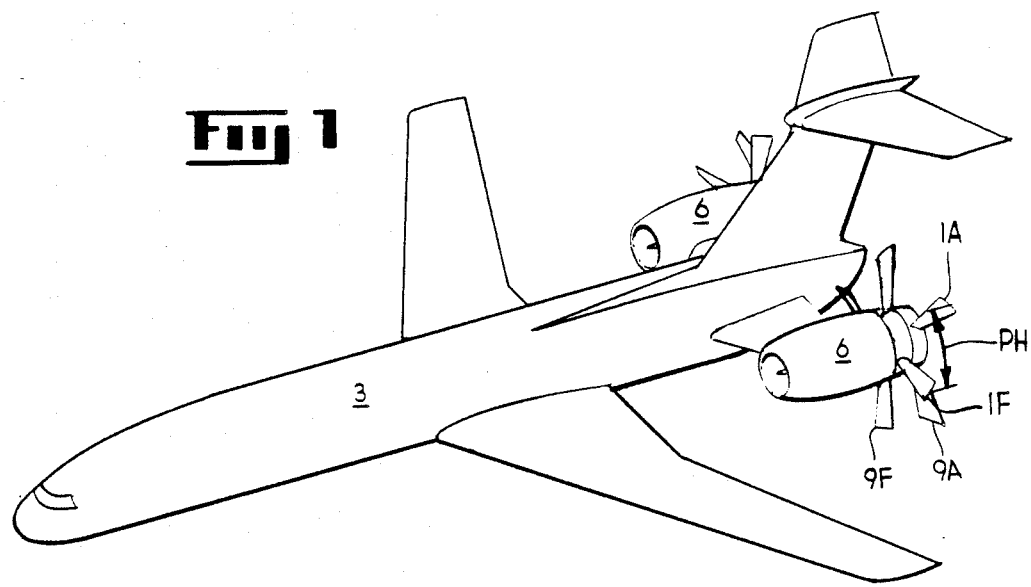
FIG. 1 illustrates an aircraft having counterrotating propellers.

Blocks 120A and 122 in FIG. 3 produce a phase signal PH indicative of the phase angle PH in FIG. 1. One approach to producing such a phase signal is to start off the propellers with a known phase angle and then to count the subsequent number of revolutions of each blade using sensors 50F and 50A in FIG. 2. One invention which accomplishes a phase measurement is disclosed in the patent application by Paul D. Collopy and George W. Bennett, Ser. No. 808,147, entitled Propeller Speed and Phase Sensor, filed on Dec. 12, 1985, and assigned to the assignee of the present invention. This application is incorporated by reference. There are other methods of ascertaining the phase of the propellers 9A and 9F, some of which are known in the art.

Irrespective of the method used, the digital phase signal PH indicative of the angle PH in FIG. 1 is subtracted in the summer 130 from a phase demand signal PHAD. PHAD is supplied by the pilot or by an automatic control. Summer 130 thus produces a phase error signal U6 which is fed to a synchrophase controller 124 which also receives a speed signal indicative of engine speed on line 125. The synchrophase controller 124, in response to the inputs just described, produces a phase control signal Y3. The phase control signal Y3 is added in summer 72 to thereby, in effect, alter the pitch error signal YE2. This causes the actuator 108 to attempt to reduce the pitch error signal YE2 by adjusting the pitch of the aft propeller 9A.

For example, in the case where both speed error signals U1 and U2 indicate that the propellers are synchronized at the demanded speed, the aircraft pilot may wish to change the phase angle PH. If he wished to increase the phase angle, he would generate a phase demand signal PHAD which would produce an error signal U6. The error signal U6 would effectively increase the pitch error signal YE2, causing the pitch of the aft propeller 9A in FIGS. 1 and 2 to increase. This increase would slow down the aft propeller, thereby tending to reduce the pitch error.

Several important aspects of the present invention will now be discussed. One: two closed feedback loops for each propeller have been described earlier. In addition, a third feedback loop, namely, a phase feedback loop, including blocks 120A, 122, and 124 and summers 72 and 130, is added to the aft propeller 9A. Thus, the control scheme includes two feedback loops for the fore propeller, but three loops for the aft propeller.

Two: the speed feedback loops are not opened up during synchronising. That is, for example, while the phase control signal YE2 is being fed to summer 72 during a phase change, neither the pitch error signals Y1D and Y2D fed to summers 70 and 72 nor the measured pitch signals ACT1F and ACT2F are disconnected from summers 70 and 72. That is, the speed loops, the pitch loops, and the phase loop remain closed and operating at all times.

Three: the phase adjustment is done by modification of the pitch of the aft propeller. Applicant's modelling and testing have shown that pitch changes on the aft propeller 9A disturb the fore propeller 9F much less than pitch changes on the fore propeller 9F disturb the aft propeller 9A: the disturbance fed forward is less than the disturbance fed aft. Accordingly, the present invention achieves synchrophasing by operation on the aft propeller, rather than upon the fore propeller.

Four: because the turbine sets 39 and 42 are fluidically coupled, their relative speeds can differ. Thus, the synchrophasing described above is possible.

Figure 4:
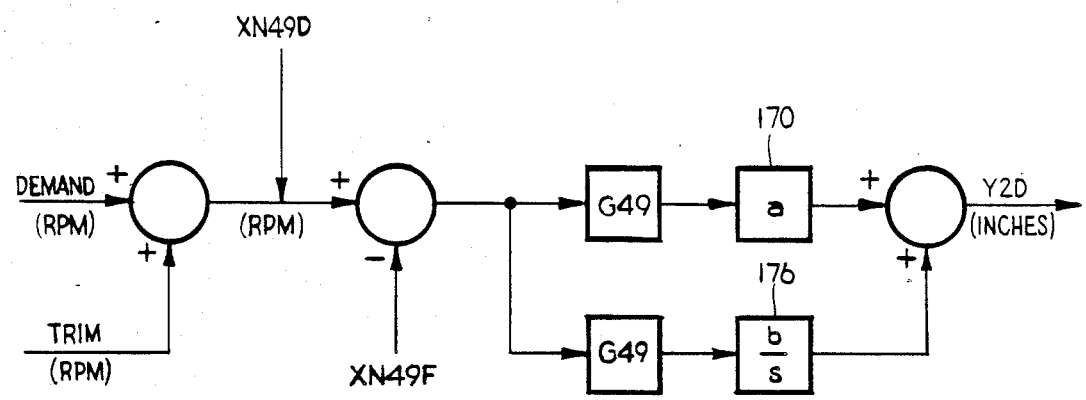
FIG. 4 illustrates in block form the operation of part of a computer program presented near the end of the specification.

Some comments will be made on the software code which follows. Lines 1 and 2 of the code refer to the operation of summers 56 and 58 in FIG. 3. Lines 3-6 refer to the numerical representation of the proportional/integral (p/i) controller indicated by blocks 62 and 64. For a continuous, analog, controller, lines 3-6 can be described as shown in FIG. 4. The p/i controller (i.e., blocks 62 and 64 in FIG. 3) is termed "proportional" because of the "a" term in block 170 in FIG. 4 ("a" in this analog case would have the value of 0.00105). The output (e.g., Y2D on line 9 of the code and shown on FIG. 4) is proportional to the input (e.g., U2 on lines 4 and 6 of the code and shown in FIG. 4) by the proportionality factor "a".

The controller is termed "integral" because of the b/s term in block 176 where "b" would have the value of 0.003 in this analog case. 1/s refers to integration in the time domain. The constants a and b in blocks 170 and 176 are represented in the numerical (i.e., digital not analog) case by the numbers 0.001065 and 0.0003 in lines 4 and 6 of the code.

For block 64 in FIGS. 3, lines 4 and 6 represent the ABCD state-transition or difference equation form of the comparable Z-transform controller $$.001065 + \frac{.00003 \ Z^{-1}}{1 - Z^{-1}}$$

for a sample period of T=0.01 second. The constants a and b in blocks 170 and 176 are not identical to those of the Z-transform due to the approximations in the relationship where $$Z \approx \frac{1 + \frac{sT}{2}}{1 - \frac{sT}{2}}$$

Restated, the values of "a" and "b" differ slightly, depending upon whether one is working the analog or digital domain.

The terms X11B and X21B in lines 7 and 9 are base-point values which are scheduled as a function of engine operating point. G48 and G49 in lines 5 and 6 are loop gain multipliers scheduled as a function of operating point. In lines 3 and 4, X1 and X2 are the past values of the states and U1 and U2 are the past values of the speed errors. In lines 3 and 4, XNEW1 and XNEW2 are the present values of the states resulting from the numerical rectangular integration. The variable X1 in line 5 is the present value of the state and is the same as variable XNEW1 in line 3. Similarly, as to X2 in line 6 with respect to XNEW2 in line 4. U1 and U2 in lines 5 and 6 are the present values of the speed errors. This distinction in nomenclature is made by the special software used in the design. The equations in lines 3-6 represent typical difference equations.

Lines 11 and 12 refer to the operation of summers 70 and 72.

The function of lines 13-16 have not been previously discussed. These lines generate what can be called "hat functions." The computed results of the hat functions are the variables GF1 and GF2 in lines 18, 20, 24, 26, 29, and 30. The operation "SIGN" in lines 13 and 14 refer to the SIGN function: for example, "SIGN(1.0,YE1)" in line 13 has a value of +1 when YE1 is positive and −1 when YE2 is negative. The operation of the hat functions is to give variables GF1 and GF2 larger values when the error signals YE1 and YE2 are small, thus making XMA1 and XMA2 in lines 29 and 30 larger. This serves to overcome the dead band in the torque motor servo valves. The Applicant has found that the dead band in the TMSV results in an error in the actual pitch angle. The "hat" function reduces this error.

Code lines 29 and 30 refer to the compensation blocks 89 and 92 in FIG. 3. GF1 and GF2 are the hat function multipliers, YE1 and YE2 are the position errors (i.e., positions of the pistons 81 and 84 in FIG. 2) and G is a conversion constant for units. (The units of XMA1 and XMA2 must be in milliamperes, while those of YE1 and YE2 are not.)

Code line 32 refers to summer 130 in FIG. 3. Lines 32-37 limit U6 to a range between −45 and +45 degrees. One function of this limiting is to treat all propeller blades as identical. Thus, for example, if the phase angle PH increases from 44 to 46 degrees, code lines 31-39 have the effect of redefining the phase angle PH from 44 degrees to one degree. Phase is thus now measured between a different pair of blades. This forty-five degree limit assumes eight blades per propeller (360/8=45). If a different number of blades is used, the limiting range will, of course, be different.

Lines 46-48 refer to a second set of difference equations representing a proportional/integral controller which is substantially identical to the proportional/integral controller used in 64, block 124 in FIG. 3. The principles discussed above in connection with FIG. 4 apply to lines 46-48 as well. Line 47 refers to signal Y3 which is fed to summer 72 in FIG. 3. G1 in lines 47 is a loop gain multiplier scheduled as a function of operating point.

Code line 2 contains the variable "TRIM", which is fed to summer 58 in FIG. 3. This variable is under the control of the pilot and allows him to select different speeds for the two propellers.

```
                    Source Code
1        U1=XN48D−XN48F
2        U2=(XN49D+TRIM)−XN49F
3        XNEW1=X1+G48*U1
4        XNEW2=X2+G49*U2
5        Y1=.00014*X1+.00427*U1*G48
6        Y2=.00003*X2+.001065*U2*G49
7        Y1D=Y1 + X11B
8    C   REFLECTS INITIAL CONDITIONS
9        Y2D=Y2 + X21B
10   C   REFLECTS INITIAL CONDITIONS
11       YE1=Y1D−ACT1F
12       YE2=(Y2D+Y3)−ACT2F
13       M1=SIGN(1.0,YE1)*(1.0−HT1)/ELIM1
14       M2=SIGN(1.0,YE2)*(1.0−HT2)/ELIM2
15       T1=M1*YE1+HT1
16       T2=M2*YE2+HT2
17       IF(ABS(YE1).LT.ELIM1)THEN
18       GF1=T1
19       ELSE
20       GF1=1.0
21       END IF
22   C
23       IF(ABS(YE2).LT.ELIM2)THEN
24       GF2=T2
25       ELSE
26       GF2=1.0
27       END IF
28   C
29       XMA1=G*YE1*GF1
```

```
                    -continued
30        XMA1=G*YE2*GF2
31        IF (L4.GT.0) THEN
32        U6=PHAD-PH
33        IF(U6.LT.-22.5)THEN
34        U6=U6+45.
35        ELSE IF(U6.GT.22.5)THEN
36        U6=U6+45.
37        ENDIF
38        ELSE
39        U6=0
40        END IF
41        IF (SP .LT. 1) THEN
42        XX3=0
43        ELSE
44        XX3=X3
45        END IF
46        XNEW3=XX3+U6*G1
47        Y3=.00003*X3+.001065*U6*G1
48    C
49        RETURN
50    C
51    C   COMPUTATION ON ACCEPTED VALUES
52   70   RETURN
53    C   FINAL COMPUTATIONS
54   80   RETURN
55        END
                   Source Code II
4         XNEW2=X2+(G49*U2+Y3)
6         Y2=0.00003*X2+0.001065*(U2*G49+Y3)
12        YE2=Y2D-ACT2F
```

A control has been described for control of a counter-rotating, turbine-driven propeller set. The control has two loops for each propeller: a speed control loop and a pitch control loop. In addition, the control has a third loop for one of the propellers, a phase control loop. All loops are preferably closed at all times, and the phase control loop preferably operates by adjusting the pitch (and thus the speed) of the aft propeller.

The preceding discussion has discussed the production of speed error signals U1 and U2 by summers 56 and 58. Applicant points out that these error signals are substantially similar to thrust error signals: the thrust of the propellers is a function of propeller speed. Therefore, one can substitute a thrust sensor for speed sensors 50A and 50F and a treat the signal on line 60 as a thrust demand signal rather than a speed demand signal. Thrust measurement can be accomplished by numerous methods known in the art. For example, thrust is a function of the total pressure drop (i.e., of pressure ratio) across the counter-rotating turbine blade sets 39 and 42 in FIG. 1. Also, thrust can be measured by strain gauges affixed to the shafts or cylinders which support the propellers 9A and 9F. Shaft elongation is a measure of thrust. In addition, thrust can be derived indirectly. A counterrotating blade set 9A and 9F can be built, either actual size or to scale, and run in a load cell. The thrust for various operating conditions, including various propeller speeds and blade pitch conditions, is recorded on a schedule. Then, under actual flight, the conditions, such as propeller speed and blade pitch, are measured and thrust is derived from the schedule based on them. Therefore, the speed loops 130 and 134 can be considered thrust loops, with thrust being the parameter that is demanded on line 60, and also being the parameter upon which the loops are closed.

Figure 5:
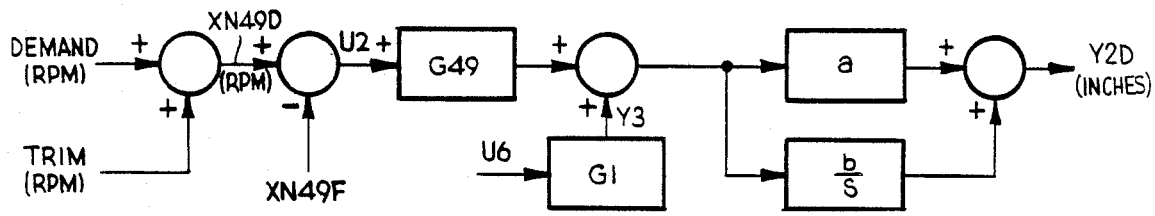
FIG. 5 illustrates a second form of the present invention.

A second embodiment is based on the fact that the digital controller 64 in FIG. 3 is similar to the synchrophase controller 124. The similarity is illustrated by the similarity in form of lines 4 and 6 in the Source Code (for digital controller 64) as compared with lines 46 and 47 (for the synchrophase controller 124). Recognition of this similarity allows one to eliminate the synchrophase controller 124 as shown in FIG. 5. FIG. 5 is implemented by replacing lines 4, 6, and 12 with the corresponding lines in Source Code II, and by eliminating lines 41-48, inclusive.

One justification for this replacement in FIG. 5 is shown by the sequence of FIG. 6A-D. FIG. 6A is a diagram which is similar to that of FIG. 5, but with an input 200 added which represents signal Y3 in FIG. 3. Y3 is the output of the synchrophase controller 124. FIG. 6B is obtained by reducing the closed-loop containing blocks 202 and 204 in FIG. 6A to a simplified "lag," namely, block 206 in FIG. 6B. FIG. 6C results from 6B by breaking line 208 in 6B as shown by lightening bolts 210. FIG. 6C is an open loop representation of FIG. 6B, but with an input 212 and an output 208. In FIG. 6D, block 216 in 6C has been split into blocks 218 and 220, with block 218 being inverted in the sense that $s/(s+a)$ is the inversion of $(s+a)/s$.

The function $f(s)$ in block 220 in FIG. 6D represents part of the synchrophase controller 124 in FIG. 3. If block 220 is given the form $(s+a)/s$, as indicated by arrow 222, and if the a terms in blocks 218 and 220 are identical, then block 218 cancels block 220. This cancellation has a very significant result: the integrators present in blocks 218 and 220 are eliminated. This is important because an integrator in any control system must be designed carefully. The integrator is always "running," always integrating its input, thus always producing an output (except, of course, in the case when the input has been zero for a long time with respect to the time constant of the integrator).

Figure 4A:
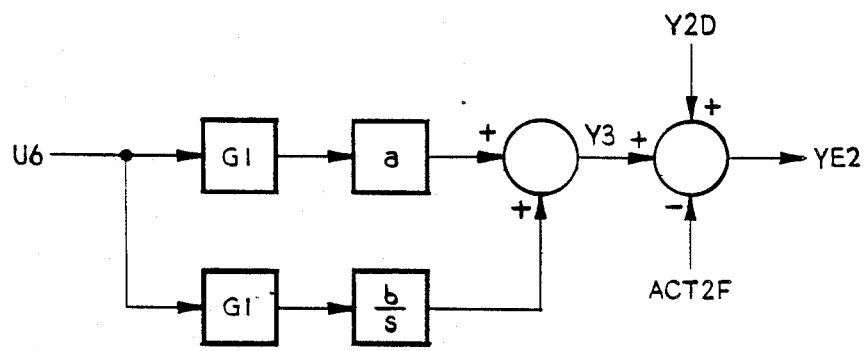
FIGS. 4A and 5A illustrate block diagram components which process the signal Y2D in FIGS. 4 and 5.
Figure 5A:
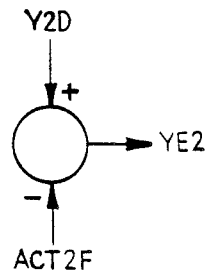
Figure 11A:
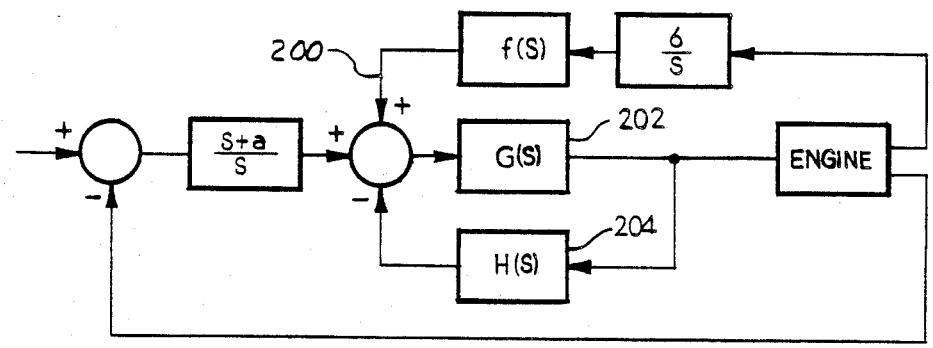
Figure 11B:
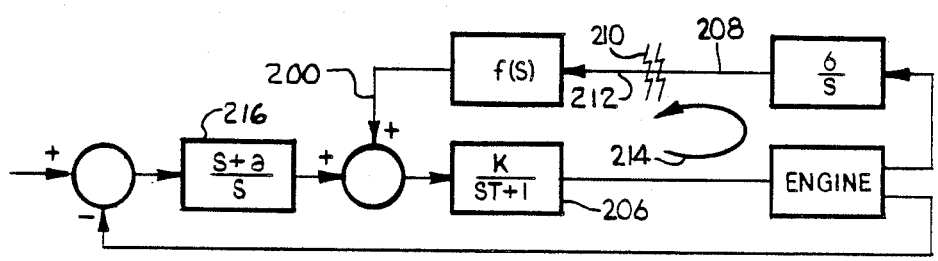
Figure 11C:
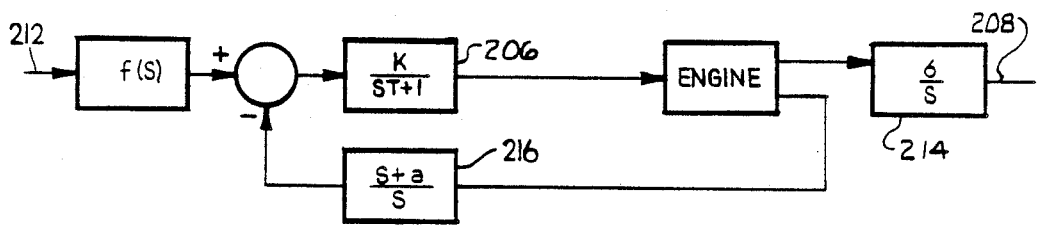
Figure 11D:
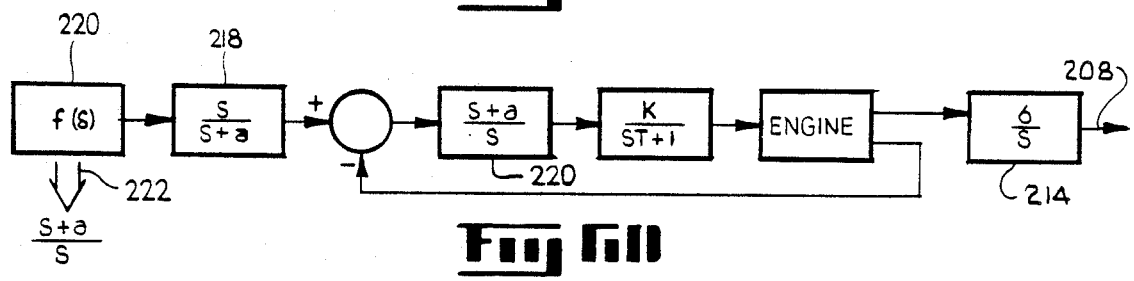

The Source Code, when modified by Source Code II, implements the concepts shown in FIG. 5. Only one integration occurs for each propeller, namely, on lines 3-9 of the Source Code. Further, even with the Source Code as originally discussed, the time constants of synchrophase controller 124 and digital controller 64 are the same. That is, the coefficients 0.00003 and 0.001065 on lines 6 and 47 are the same. This allows one to eliminate block 124 in FIG. 3 and to introduce U6 directly into block 64 with the proper gain schedule, G1, as indicated by dashed line 250 in FIG. 3. Accordingly, the processing of Y2D in FIG. 4 by the components in FIG. 4A is changed to the processing of Y2D in FIG. 5 by the components in FIG. 5A.

Numerous modifications and substitutions can be undertaken without departing from the true spirit and scope of the invention as defined in the following claims. What is desired to be secured by Letters Patent is the invention as defined in the following claims.

I claim:

1. A control for aft and fore aircraft propellers which rotate about a common axis, comprising:
   (a) means for controlling the speed of the fore propeller, comprising:
      (i) a first propeller speed sensor for sensing speed of said fore propeller; and
      (ii) first speed control means for controlling the speed of said fore propeller responsive to said sensed fore propeller speed;
   (b) means for controlling the speed of the aft propeller, comprising:
      (i) a second propeller speed sensor for sensing speed of said aft propeller; and (ii) second speed control means for controlling the speed of said aft propeller responsive to said sensed aft propeller speed; and (c) means for controlling the phase angle between the two propellers in response to a difference signal derived from the outputs of said first and second speed sensors.

2. A control for aft and fore aircraft propellers which rotate about a common axis, comprising:

(a) first propeller speed sensing means for sensing speed of said fore propeller;

(b) means for modifying the pitch of the fore propeller in response to the speed of the fore propeller; and (c) second propeller speed sensing means for sensing speed of said aft propeller;

(d) means for deriving a phase angle signal from the outputs of said first and second speed sensing means; and (e) means for modifying the pitch of the aft propeller in response to both the speed of the aft propeller, and the phase angle signal.

3. A control for aft and fore aircraft propellers which rotate about a common axis, comprising:

(a) first thrust sensing means for measuring the thrust of said fore propeller;

(b) means for modifying the pitch of the fore propeller in response to the thrust of the fore propeller;

(c) second thrust sensing means for measuring the thrust of said aft propeller;

(d) means for measuring a phase angle between said fore and aft propellers; and (e) means for modifying the pitch of the aft propeller in response to both the thrust of the aft propeller, and the phase angle between the two propellers.

4. A control for aft and fore aircraft propellers which rotate about a common axis, comprising:

(a) means for detecting the speed of said fore propeller;

(b) means for detecting the pitch of said fore propeller;

(c) means for modifying the pitch of the fore propeller in response to the speed of the fore propeller and the pitch of the fore propeller;

(d) means for detecting the speed of the aft propeller;

(e) means for detecting the pitch of said aft propeller; and (f) means for modifying the pitch of the aft propeller in response to the speed of the aft propeller, the pitch of the aft propeller, and the phase angle between the two propellers.

5. A control for a counterrotating coaxial pair of aircraft propellers, comprising:

means for controlling the speed of a first of the propellers by adjusting the pitch of the first propeller;

means for controlling the speed of a second of the propellers by adjusting the pitch of the second propeller;

means for measuring the relative phase angle between the first and second propellers; and means for adjusting the relative phase angle by adjusting the pitch of one of the propellers to thereby alter the speed of that one propeller.

6. A control for aft and fore aircraft propellers which rotate in opposite directions about a common axis, comprising:

(a) a fore speed sensor for producing a fore speed signal indicative of the speed of the fore propeller;

(b) an aft speed sensor for producing an aft speed signal indicative of the speed of the aft propeller;

(c) a fore pitch sensor for producing a fore pitch signal indicative of the pitch of the fore propeller;

(d) an aft pitch sensor for producing an aft pitch signal indicative of the pitch of the aft propeller;

(e) a phase sensor for producing a phase signal indicative of the phase angle between the two propellers;

(f) a fore pitch actuator for changing the pitch of the fore propeller;

(g) an aft pitch actuator for changing the pitch of the aft propeller;

(h) means for comparing the fore and aft speed signals with a demanded speed signal and for producing fore and aft speed error signals;

(i) means for processing the fore and aft speed error signals and for providing processed fore and aft speed error signals indicative of a fore and aft pitch angle correction required to adjust the speed of the respective fore and aft propellers;

(j) means for comparing the fore and aft speed error signals with the respective fore and aft pitch signals and producing fore and aft pitch error signals;

(k) means for changing the respective pitches of the fore and aft propellers in response to the respective pitch error signals of (j);

(l) means for comparing the phase signal with a demanded phase signal and for producing a phase error signal; and (m) means for modifying the aft processed speed error signal of (i) in response to the phase error signal.

* * * * *